United States Patent
Hannewald

(10) Patent No.: US 7,011,073 B2
(45) Date of Patent: Mar. 14, 2006

(54) THROTTLE VALVE HOUSING

(75) Inventor: Thomas Hannewald, Griesheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/843,356

(22) Filed: May 12, 2004

(65) Prior Publication Data

US 2005/0017211 A1    Jan. 27, 2005

Related U.S. Application Data

(63) Continuation of application No. PCT/DE02/03820, filed on Oct. 10, 2002.

(30) Foreign Application Priority Data

Nov. 15, 2001  (DE) ................................ 101 56 213

(51) Int. Cl.
F02D 9/10           (2006.01)
(52) U.S. Cl. ...................................... 123/337; 251/305
(58) Field of Classification Search ................ 123/337; 251/305
See application file for complete search history.

(56) References Cited

U.S. PATENT DOCUMENTS

| | | | |
|---|---|---|---|
| 3,295,821 A | 1/1967 | McQuown | |
| 3,990,675 A | 11/1976 | Bonafous | |
| 4,188,012 A | 2/1980 | Johnson | |
| 4,926,821 A | 5/1990 | Porth et al. | |
| 5,188,078 A | 2/1993 | Tamaki | |
| 5,884,898 A * | 3/1999 | Miyairi | 251/305 |
| 6,138,988 A | 10/2000 | Bouvet et al. | |
| 6,273,119 B1 * | 8/2001 | Foster et al. | 251/305 |
| 6,338,467 B1 * | 1/2002 | Mabboux et al. | 251/305 |
| 6,427,975 B1 * | 8/2002 | Powell | 251/305 |
| 6,491,020 B1 * | 12/2002 | Kotchi et al. | 123/337 |
| 6,722,633 B1 * | 4/2004 | Kawai | 251/305 |
| 6,761,348 B1 * | 7/2004 | Michels et al. | 251/305 |
| 2001/0003357 A1 * | 6/2001 | Bonomi | 251/305 |
| 2003/0080310 A1 * | 5/2003 | Burian et al. | 251/305 |

FOREIGN PATENT DOCUMENTS

| | | |
|---|---|---|
| DE | 29 01 475 A1 | 1/1980 |
| DE | 43 40 882 A1 | 6/1995 |
| DE | 195 00 501 A1 | 1/1996 |
| DE | 196 30 867 A1 | 2/1998 |
| DE | 198 20 421 A1 | 11/1998 |
| DE | 200 08 404 U1 | 9/2000 |
| DE | 199 58 045 A1 | 6/2001 |

(Continued)

OTHER PUBLICATIONS

DE—19958045A1—Derwent Abstract; Jun. 21, 2001; Erhard GmbH & Co. D-89522 Heidenheim (Germany).

(Continued)

Primary Examiner—Erick Solis
(74) Attorney, Agent, or Firm—Jacob Eisenberg; Siemens AG

(57) ABSTRACT

The invention relates to a throttle valve housing, particularly for an internal combustion engine of a motor vehicle, comprising a tubular housing part whose flow-through channel can be closed off from a gaseous medium by means of a throttle valve mounted on a throttle valve shaft. A tubular inlet area and a tubular outlet area are situated at the ends of the housing part, have flow-through openings that extend the flow-through channel, and can be detachably connected to a supply tube and a discharge tube. The inlet area and the outlet area can be produced as separate parts and can be connected to the housing part in a fixed manner.

21 Claims, 3 Drawing Sheets

FOREIGN PATENT DOCUMENTS

| | | |
|---|---|---|
| DE | 100 15 918 A1 | 10/2001 |
| DE | 101 51 584 A1 | 6/2002 |
| FR | 1.020.932 | 2/1953 |
| FR | 64.585 | 11/1955 |
| JP | 200 109 9333 | 9/1999 |
| WO | WO01/63218 A2 | 8/2001 |

OTHER PUBLICATIONS

DE—20008404U1—Derwent Abstract; Sep. 21, 2000; Bopp & Reuther Armaturen GbH, D-68305 Mannheim (Germany).

DE—19630867A1—Derwent Abstract; Feb. 5, 1998; Pierburg AG, D-41460 Neuss (Germany).

DE—19500501A1—Derwent Abstract; Jan. 4, 1996; Schatz Thermo Engineering, D-82131 Gauting (Germany).

DE—19820421A1—Derwent Abstract; Nov. 12, 1998; Hitachi Ltd, JP-Tokyo; Hitachi Car Engineering Co. LTD, JP-Hitachinaka, Ibaraki (Japan).

DE—10151584A1—Derwent Abstract; Jun. 6, 2002; Kurt Stoetzel, D-51491 Overath (Germany).

DE—10015918A1—Derwent Abstract; Oct. 4, 2001; Robert Bosch GmbH, D-70469 Stuttgart (Germany).

DE—4340882A1—Derwent Abstract; Jun. 8, 1995; Robert Bosch GmbH, D-70469 Stuttgart (Germany).

DE—2901475A1—Derwent Abstract; Jan. 17, 1980; Maezawa Kasei Kogyo K.K. JP-Tokyo (Japan).

FR—1020.932—Translated Abstract; Feb. 12, 1953; M. Jaques-Jean Ciboit; France.

Fr—1.020.932—Translated Abstract; 11714/1955; M. Jacques-Jean Ciboit; France.

* cited by examiner

THROTTLE VALVE HOUSING

CROSS REFERENCE TO RELATED APPLICATIONS

The present application is a continuation of international application PCT/DE02/03820 filed Oct. 10, 2002, which designated the United States, and further claims priority to German application 10156213.6, filed Nov. 15, 2001, the both of which are herein incorporated by reference.

BACKGROUND OF THE INVENTION

The invention is concerned with a throttle valve housing, in particular for an internal combustion engine of a motor vehicle, having a tubular housing part whose flow-through channel can have a gaseous medium, in particular air, flowing through it, can be closed off by means of a throttle valve arranged on a throttle valve shaft and at whose ends are arranged a tubular inlet area and a tubular outlet area which have flow-through openings extending the flow-through channel and can be detachably connected to a supply tube and a discharge tube.

Throttle valve housings of this type are usually injection molded from aluminum and then the flow-through channel and the inlet and outlet area with their flow-through openings are cut. This presupposes that the areas which are to be machined are rectilinear and symmetrical.

Furthermore, the construction of the housing part which is integral with the inlet and outlet part has to be such that removal from the mold is possible after the injection molding process.

The construction of the housing part is frequently identical for very different applications, and only the inlet area or the outlet area has a different configuration.

The production of the known throttle valve housings is therefore complex and expensive.

SUMMARY OF THE INVENTION

It is therefore the object of the invention to provide a throttle valve housing of the type mentioned at the beginning making production with different shaping simple and cost effective.

According to the invention, this and other objects are achieved in that the inlet area and/or the outlet area can be produced as separate components and can be connected to the housing part in a fixed manner. It is therefore possible, on the one hand, in the case of standardized housing parts to produce inlet and/or outlet areas of very different shaping separately and then to connect them to the housing part in a fixed manner. This permits a great diversity of variants.

In this case, the different shaping can relate to the connecting geometry of the inlet area and outlet area, with which the throttle valve housing is connected to the supply tube and the discharge tube.

The uniform, standardized housing part reduces the tools required to produce it.

Furthermore, shapings are also possible which would not be possible in a casting technique in the case of the inlet and outlet areas being integral with the housing part, due to not being able to remove them from the mold.

One possibility for connecting the inlet area and/or outlet area to the housing part is for the inlet area and/or outlet area to be connectable to the housing part by bonding. A reactive hot adhesive can advantageously be used for this.

A further, likewise advantageous connecting possibility is for the inlet area and/or outlet area to be connectable to the housing part by welding, in particular laser welding.

If the inlet area and/or outlet area can be connected to the housing part by encapsulating the particular end of the housing part by injection molding, then both the production of the inlet and/or outlet area and also the connection of this part to the housing part take place in a single operating cycle.

Without a great outlay on installation, the inlet area and/or outlet area can be connected to the housing part by a plug-in connection, a clip or latching connection or else also by a press connection.

A seal, in particular a sealing ring, can be arranged between the inlet area and/or outlet area, on the one hand, and the housing part, on the other hand, to avoid the leakage of air.

In particular in the case of a welding or bonding connection, the inlet part and/or the outlet part can be connected on the end side to the housing part.

For simple production requiring little or even no finishing work, the inlet part and/or the outlet part and/or the housing part can be an injection molded part.

In this case, the inlet part and/or the outlet part and/or the housing part can be a plastic injection molded part or else a metal injection molded part, in particular an aluminum injection molded part. One or more of these parts can also be a metal injection molded part to which a plastic injection molded part is connected.

The inlet part and/or the outlet part can have an extent which differs from a straight line, so that they form, for example, an angled or curved connection.

The separate production and subsequent connection of the housing part and inlet part and/or outlet part makes it easily possible, even with a complicated shaping, for the inlet part and/or the outlet part to have an element protruding into the flow-through opening of the inlet part and/or of the outlet part.

In this case, a protective grid or ice grid or else a sensor, in particular a flow sensor or a temperature sensor, can be arranged-in the flow-through opening.

BRIEF DESCRIPTION OF THE SEVERAL VIEWS OF THE DRAWINGS

Exemplary embodiments of the invention are illustrated in the drawing and are described in greater detail below. In the drawing

DETAILED DESCRIPTION OF THE INVENTION

Figure 1:
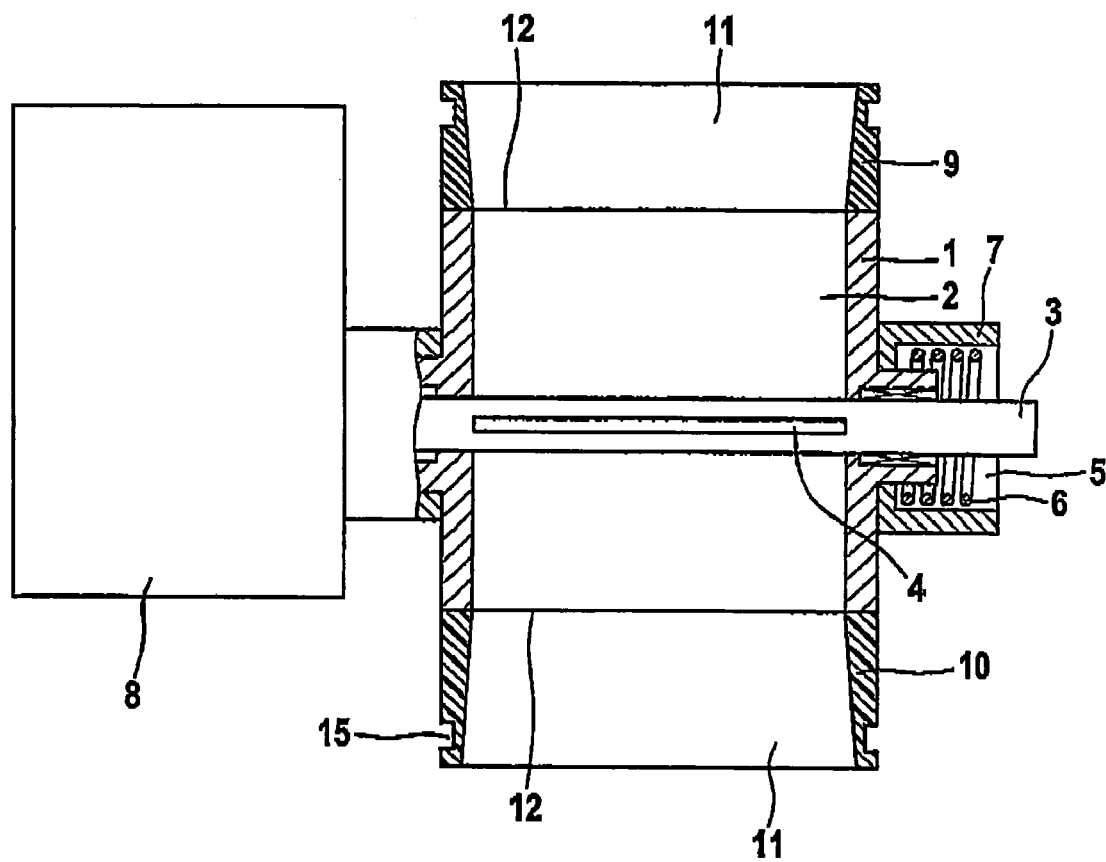
FIG. 1 shows a first exemplary embodiment of a throttle valve housing in cross section

The throttle valve housings illustrated in the figures all have a tubular housing part 1 of aluminum or an aluminum alloy with a cylindrical flow-through channel 2. A throttle valve shaft 3, on which a throttle valve 4 is arranged to more or less close off the flow-through channel 2, is arranged transversely with respect to the flow-through channel 2 and protrudes with its one end through a corresponding hole in the housing part 1 into a spring chamber 5. Arranged in the spring chamber 5 is a restoring spring 6 which is designed as a torsion spring, surrounds the throttle valve shaft 3 and is fastened at one end to the throttle valve shaft 3 and at its other end to the spring chamber housing 7. The restoring spring 6 pressurizes the throttle valve shaft 3 into the illustrated closed position of the throttle valve 4.

The other end of the throttle valve shaft 3 protrudes through a corresponding hole in the housing part 1 into an adjusting drive housing 8, in which are arranged an electric-powered actuator and a transmission, by means of which the throttle valve shaft 3 can be adjusted counter to the force of the restoring spring 6.

In the figures, a tubular inlet area 9, 9' and 9" adjoins the upper end side of the housing part 1 and a tubular outlet area 10, 10' and 10" adjoins the lower end side of the housing part 1.

The inlet areas 9, 9', 9" and the outlet areas 10, 10', 10" have flow-through openings 11, 11', 11" which, at their transition to the flow-through channel 2, have the same cross section as the latter and continue it.

In FIG. 1, the inlet area 9 and the outlet area 10, which consist of plastic, are bonded on end-side bonding points 12 to the housing part 1 by a reactive hot adhesive.

The inlet area 9 and outlet area 10 extend rectilinearly to the housing part 1 and have a conically expanding cross section of the flow-through opening 11 toward their mouths which face away from the housing part 1. While the inlet area 9 ends at this mouth without an additional configuration, the outlet area 10 has a radially encircling groove 15 on the radially encircling, outer casing surface.

Figure 2:
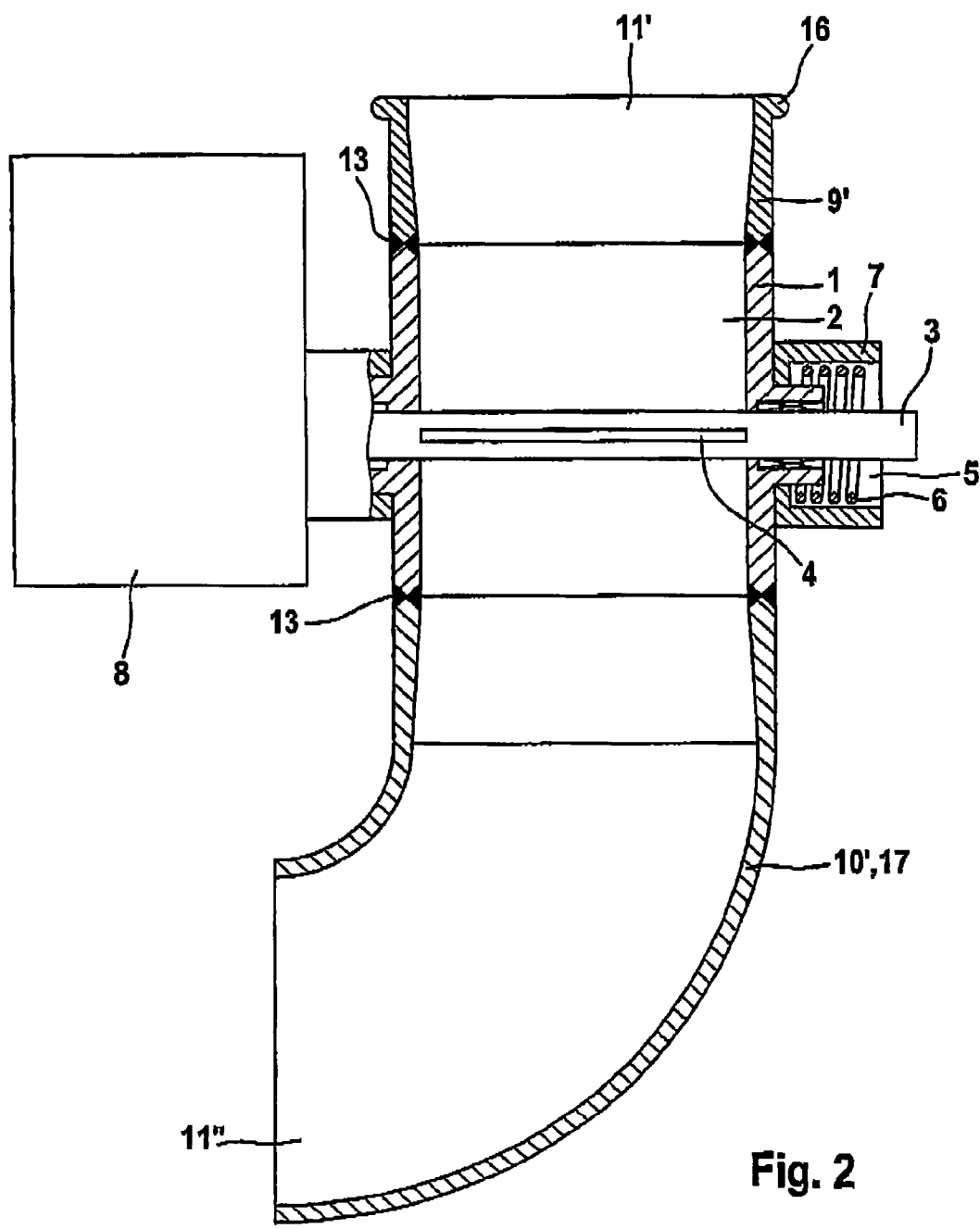
FIG. 2 shows a second exemplary embodiment of a throttle valve housing in cross section
Figure 3:
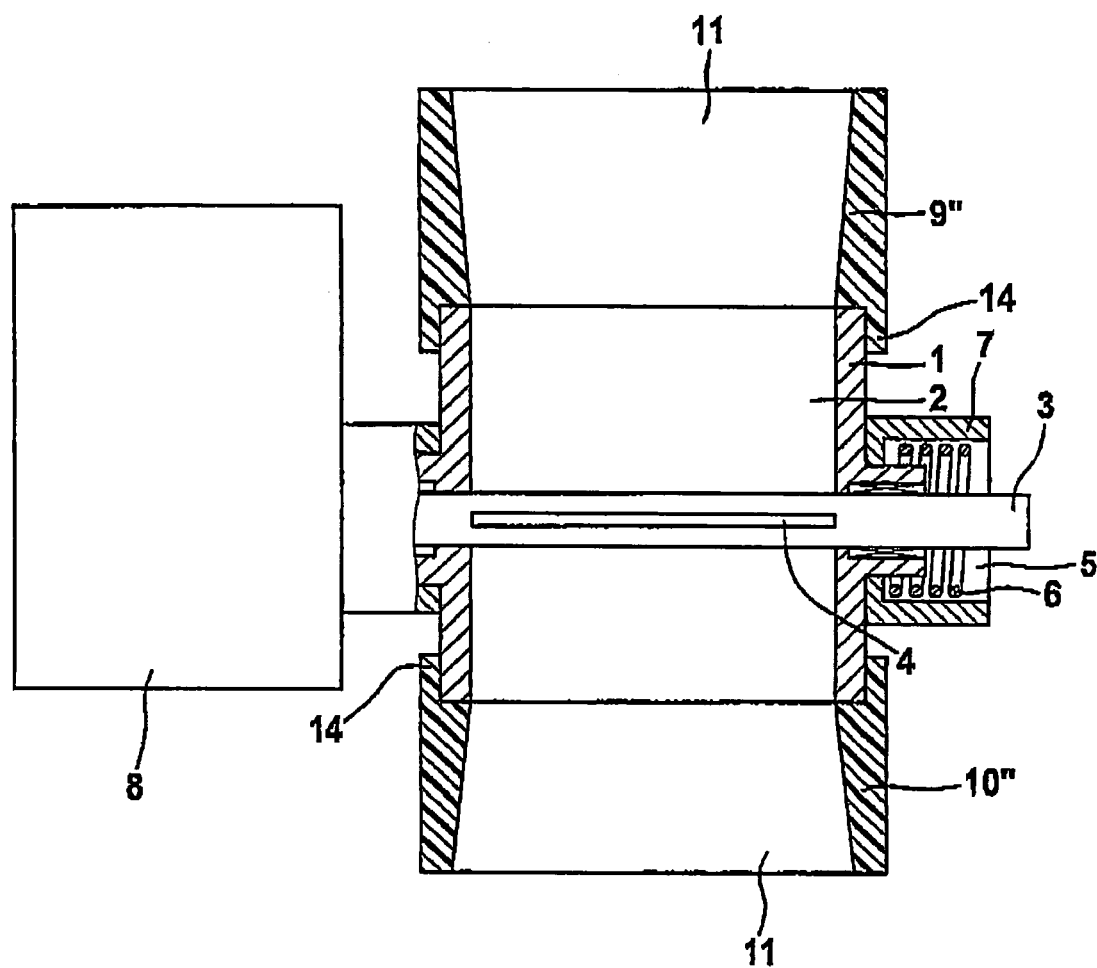
FIG. 3 shows a third exemplary embodiment of a throttle valve housing in cross section.

In the exemplary embodiment of FIG. 2, the likewise end-side connection of the inlet area 9' and outlet area 10', which consist of aluminum, to the housing part 1 consists of a weld 13. The inlet part 9' likewise extends rectilinearly to the housing part 1. The flow-through opening 11' of the inlet part 9' has a cross section which increases in a curved manner toward the mouth which leads outward. A radially encircling bead 16 is arranged on the radially encircling, outer casing surface of the inlet area 9'. The outlet part 10' is designed as a curved connection 17 whose cross section of the flow-through opening 11" tapers conically in its last part toward the housing part 1. In FIG. 3, the inlet area 9" and outlet area 10" consist of plastic and are connected to the housing part 1 by an encapsulation 14 of the mouth regions of the housing part 1 by injection molding. As in FIG. 1, the inlet area 9" and outlet area 10" extend rectilinearly to the housing part 1 and have cross sections which expand conically toward the mouths of the flow-through openings 11.

I claim:

1. A throttle valve housing for an internal combustion engine, comprising:
   a tubular housing part including a flow-through channel for a gaseous medium, an upstream end side and a downstream end side;
   a tubular inlet area comprising a flow-through opening, a first end contiguously adjoining the upstream end side such that the flow-through opening extends flow of the flow-through channel, and a second end distal from the first end, the second end comprising first means for detachably connecting with a supply tube;
   a tubular outlet area comprising flow-through opening, a first end contiguously adjoining the downstream end side such that the flow-through opening of the tubular outlet area extends flow of the flow-through channel, and a second end distal from the first end of the tubular outlet area, the second end of the tubular outlet area comprising second means for detachably connecting with a discharge tube;
   a throttle valve arranged within the housing part to close off the flow-through channel; and
   a throttle valve shaft pivotally arranged within the housing part so as to accommodate the throttle valve thereon.

2. The throttle valve housing according to claim 1, wherein at least one of the first end of the inlet area and the first end of the outlet area is bonded to the upstream end side and the downstream end side respectively.

3. The throttle valve housing according to claim 1, wherein at least one of the first end of the inlet area and the first end of the outlet area is welded to the upstream end side and the downstream end side respectively.

4. The throttle valve housing according to claim 1, wherein at least one of the first end of the inlet area and the first end of the outlet area is encapsulated with the upstream end side and the downstream end side, respectively, by injection molding.

5. The throttle valve housing according to claim 1, wherein at least one of the first end of the inlet area and the first end of the outlet area is connected with the upstream end side, and the downstream end side, respectively, by a plug-in connection.

6. The throttle valve housing according to claim 1, wherein at least one of the first end of the inlet area and the first end of the outlet area is connected with the upstream end side and the downstream end side, respectively, via a clip or latching connection.

7. The throttle valve housing according to claim 1, wherein at least one of the first end of the inlet area and the first end of the outlet area is connected with the upstream end side and the downstream end side, respectively, via a press connection.

8. The throttle valve housing according to claim 1, further comprising a seal arranged between at least one of; the first end of the inlet area and upstream end side; and the first end of the outlet area and downstream end side.

9. The throttle valve housing according to claim 1, wherein at least one of the inlet part, the outlet part, and the housing part is an injection molded part.

10. The throttle valve housing according to claim 9, wherein at least one of the inlet part, the outlet part, and the housing part is a plastic injection molded part.

11. The throttle valve housing according to claim 9, wherein at least one of the inlet part, the outlet part, and the housing part is a metal injection molded part.

12. The throttle valve housing according to claim 1, wherein at least one of the inlet part and the outlet part has an extent deviating from a straight line.

13. The throttle valve housing according to claim 1, wherein at least one of the inlet part and the outlet part has an element protruding into the flow-through opening of at least one of the inlet part and the outlet part.

14. The throttle valve housing according to claim 13, further comprising a protective grid or ice grid arranged in the flow-through opening.

15. The throttle valve housing according to claim 13, further comprising a sensor arranged in the flow-through opening.

16. The housing according to claim 1, wherein the gaseous medium is air.

17. The housing according to claim 3, wherein the welding is laser welding.

18. The housing according to claim 8, wherein the seal is a sealing ring.

19. The housing according to claim 11, wherein the metal injection molded part is an aluminum metal injection molded part.

20. The housing according to claim 15, wherein the sensor is one of a flow sensor and a temperature sensor.

21. The housing according to claim 1, wherein at least one of the first and second means for detachably connecting comprises at least one of a radially encircling groove and radially encircling bend.

* * * * *